United States Patent [19]

Kimura et al.

[11] Patent Number: 4,618,132
[45] Date of Patent: Oct. 21, 1986

[54] REAR WINDOW LIGHT SCREEN PARTICULARLY FOR AN AUTOMOBILE

[75] Inventors: Ryoichi Kimura, Saitama; Kanji Nomura, Kawasaki; Kazumi Ubukata, Kawasaki; Shinju Kasahara, Kawasaki, all of Japan

[73] Assignee: Honda Giken Kogyo Kabushiki Kaisha, Kawasaki, Japan

[21] Appl. No.: 613,739

[22] Filed: May 24, 1984

[30] Foreign Application Priority Data

May 31, 1983 [JP] Japan ............................ 58-83789[U]

[51] Int. Cl.⁴ ................................................ B60J 3/02
[52] U.S. Cl. ..................... 296/97 J; 296/97 F; 49/64; 340/522
[58] Field of Search ................. 296/97 R, 97 F, 97 H, 296/97 J, 97 K, 95 R, 95 C, 96; 49/62, 63, 64, 67; 340/667, 521, 522

[56] References Cited

U.S. PATENT DOCUMENTS

| 2,279,011 | 4/1942 | Nicholson | 296/97 J |
| 2,565,979 | 8/1951 | Michaelsen | 49/64 X |
| 2,574,729 | 11/1951 | Coffman | 296/97 F |
| 2,607,906 | 8/1952 | Sang | 296/97 J |
| 2,657,923 | 11/1953 | Coppage | 49/62 X |
| 3,343,868 | 9/1967 | Manookian, Jr. | 296/97 R |
| 3,770,313 | 11/1973 | Jimenez | 296/95 C |
| 3,894,206 | 7/1975 | Suzuki et al. | 340/667 X |
| 4,042,918 | 8/1977 | Klitzman | 340/522 X |
| 4,242,672 | 12/1980 | Gault | 340/667 X |
| 4,250,486 | 2/1981 | Kiefer et al. | 340/522 X |
| 4,360,801 | 11/1982 | Duhane | 340/522 X |
| 4,497,515 | 2/1985 | Appelson | 296/97 G X |

FOREIGN PATENT DOCUMENTS 2525971 11/1983 France ............................ 296/97 B Primary Examiner—David A. Scherbel
Assistant Examiner—Russell D. Stormer
Attorney, Agent, or Firm—Finnegan, Henderson, Farabow, Garrett & Dunner

[57] ABSTRACT

A light screen device for an automobile window includes a plurality of vanes located adjacent to a window and rotated to a light-blocking position when the vehicle is not in operation and to a light-admitting position when the vehicle is operated.

8 Claims, 2 Drawing Figures

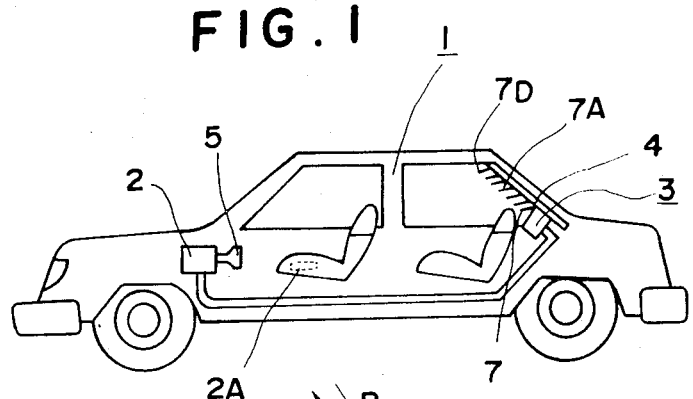
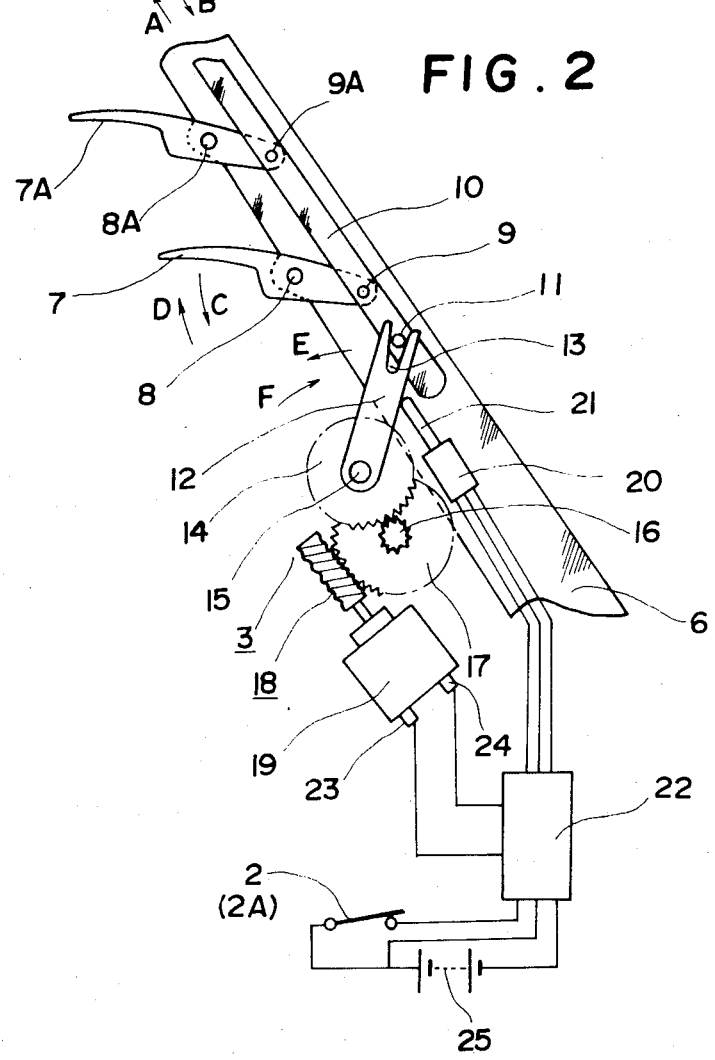

REAR WINDOW LIGHT SCREEN PARTICULARLY FOR AN AUTOMOBILE

FIELD OF THE INVENTION

The present invention relates to a rear window light screen or blind, particularly for an automobile, which automatically functions to prevent direct rays of sun from passing through the rear window of an automobile when the vehicle is stopped or parked but allows an unobstructed view through the rear window during operation of the car.

BACKGROUND OF THE INVENTION

There have already been commercially available manually operated light screen or blind devices for such purpose. They are manually opened and shut independently of the car's conditions, i.e., independently of whether the automobile is running, stopped, or parked. Such blind devices have been disadvantageous in that the careless operation of shutting the blind when the automobile is being driven results in the dangerous obstruction of the rear view.

OBJECTS AND SUMMARY OF THE INVENTION

It is an object of the present invention to provide a safe and effective light screen in the rear window of an automobile.

Another object of the present invention is to provide a light screen in the rear window of an automobile which will not impede vision through the rear window during operation of the vehicle.

Still another object of the present invention is a light screen for use in the rear window of an automobile which is only deployed in the absence of operation of or an operation in the automobile.

These and other objects are achieved by a light screen device for selectively blocking light from entering the rear window of an automobile comprising a plurality of vanes, means for rotating the vanes between a light blocking position and a light admitting position, means for generating a vehicle operation signal, and means for controlling the rotating means to rotate the vanes to the light blocking position responsive to the vehicle operation signal indicating non-operation of the vehicle and to the light admitting position responsive to the vehicle operation signal indicating operation of the vehicle.

BRIEF DESCRIPTION OF THE DRAWINGS

These and other objects and advantages of the present invention will become clear from the following description of the invention when considered with reference to the following drawings, in which:

FIG. 1 schematically illustrates an automobile including the light screen device of the present invention; and FIG. 2 illustrates the mechanism of the light screen device of the present invention.

DETAILED DESCRIPTION OF THE PREFERRED EMBODIMENT

An automobile 1 includes an ignition switch 2 which is electrically associated by a drive mechanism 3 with a light screen device 4. The ignition switch 2 may be replaced by a seat sensor switch 2A mounted in or on a seat. A key 5 is adopted for insertion into the ignition switch 2.

A stationary arm member 6, constitutes a part of the rear light screen 4 and includes a plurality of stationary pins 8, 8A, 8B . . . on which screen vanes 7, 7A, 7B . . . are pivotally supported.

Means are provided for rotating the vanes 7, 7A, 7B . . . between a light blocking position and a light admitting position. As embodied herein this means comprises connector pins 9, 9A, 9B . . . connected to respective screen vanes 7, 7A, 7B . . . at their base ends and to an actuator lever 10. The blind vanes 7, 7A, 7B . . . are angularly moved around the respective stationary pins 8, 8A, 8B . . . in a direction as indicated by an arrow C or an arrow D, as the actuator lever 10 is moved in a direction as indicated by an arrow A or an arrow B, respectively.

The rotating means further includes a pin 11 on the actuator lever 10 at a portion of its length in a loose engagement with a notch 13 of a fork-like drive arm 12.

The drive arm 12 is mounted on a gear 14 at a base end of the arm 12 at 15 so that the drive arm 12 is angularly moved in a direction as indicated by an arrow E or an arrow F as the gear 14 is angularly moved counterclockwise or clockwise, respectively.

The rotating means further includes a reduction gear system including gears 16, 17 and a transmission gear 18 directly coupled to an electric motor 19, serving as a drive means, on one side, and engaged with the reduction gear system 17, on the other side.

Rotation of the electric motor 19 causes angular movement of the arm 12 in the direction of the arrow E or F via the transmission gear 18, the reduction gear system 17, 16 and the gear 14.

A position detection change-over switch 20 includes a contact 21 which is normally biased against the drive arm 12. The change-over switch 20 is adapted to detect an angular position of the drive arm 12, in other words, whether the blind vanes 7, 7A, 7B . . are opened or shut. The output of the switch 20 is changed depending on the detected position.

Means are provided for controlling the rotating means to rotates the vanes 7, 7A, 7B . . . between the light blocking position and the light admitting position. As embodied herein, the controlling means comprises an electronic control circuit 22 connected to the position detection change-over switch 20 so that, in response to a signal coming from the position detection switch 20, the electronic control circuit 22 applies input terminals 23, 24, of the electric motor 19 with components +, −, or −, 130 , respectively.

Specifically, both the ignition switch 2 and the seat sensor switch 2A are in ON-state while the car 1 is operating, the seat sensor switch 2A being in this state because then a driver is sitting on the seat, so that the power components +, −, are supplied via the electronic control circuit 22 to the input terminals 22, 24, respectively, rotating the motor 19 forwards, to open the blind vanes 7, 7A, 7B . . .

The light screen device further includes means for generating a vehicle operation signal. As embodied herein the generating means comprises the ignition switch 2 or the seat sensor 2a. Upon turning the ignition switch 2 OFF by stopping or parking the car, or upon turning the seat sensor switch 2a OFF as the driver leaves the seat, an OFF signal from the switch 2 or 2A and an "open screen vanes" signal from the position detection change-over switch 20 cause the electronic control circuit 22 to apply the input terminals 23, 24 of the motor 19 with the power components −, +, respectively, to rotate the motor 19 in reverse. Reference numeral 25 designates a DC power source. The manner in which the present invention of the above-described construction functions will be described below.

Assuming that the ignition switch 2 is turned ON by insertion of the key 5 and that the screen vanes 7, 7A, 7B . . . are shut, the electronic control circuit 22 is applied with an ON signal from the switch 2 and the signal from the position detection change-over switch 20. Under these circumstances, the terminals 23, 24 of the motor 29 are supplied with the components +, −, respectively.

As a consequence, the motor 19 is rotated in the forward direction and angularly moves the drive arm 12 through the transmission gear 18, the reduction gear system 17, 16 and the gear 14 in the direction as indicated by the arrow E. As a result, the actuator lever 10 is driven through the fork-like portion or notch 13 and the pin 11 moves in the direction indicated by the arrow A.

Such movement of the actuator lever 10 in the direction of the arrow A causes the connector pins 9, 9A, 9B . . . to rotate the blind vanes 7, 7A, 7B . . .

As long as the car 1 is operating, the blind vanes 7, 7A, 7B . . . are maintained open, since the ignition switch 2 is kept in ON-state. Upon turning OFF the ignition switch 2, for example as the driver exits the car, the OFF signal from the switch 2 and the signal from the position detection change-over switch 20 cause the electronic control circuit 22 to supply the input terminals 23, 24 of the motor with the power components −, +, respectively. As a result, the motor 19 is rotated in reverse to shut the blind vanes 7, 7A, 7B . . .

According to the present invention having the construction and the function as have been described hereinabove, an advantageous effect is provided in that the screen vanes are automatically maintained open to assure the unobstructed rear view as long as the car is running. The blind vanes are reliably shut, however, to intercept the sunlight whenever the car is stopped or parked, i.e., is not in operation.

It should be understood that the present invention is not limited to the particular embodiment described, but rather is susceptible to modifications, alterations, and equivalent arrangements within the scope of the appended claims.

What is claimed is:

1. A light screen device for selectively blocking light from entering through a window of an automobile comprising:
    a plurality of screen vanes adjacent the window; and
    means for rotating said vanes between a light blocking position and a light admitting position said rotating means comprising driving means operated selectively to cause rotation of said vanes between said light blocking and light admitting positions in response to a first signal from a position detection means, said signal indicating a light blocking and light admitting position of said vanes, and in response to a second signal indicating an on or off state of automobile ignition said driving means rotating said vanes to light admitting position when said first signal indicates said vanes are in the light blocking position and when said second signal indicates the on state of the ignition and said driving means rotating said vanes to the light blocking position when said first signal indicates said vanes are in the light admitting position and when said second signal indicates off state of the ignition.

2. A light screen device according to claim 1 wherein said rotating and driving means further comprises:
    a plurality of pivot pins on which said vanes are singly mounted for rotation;
    a drive lever connected to each of said vanes for rotating said vanes about said pivot pins;
    an electric motor rotatable in a forward and a reverse direction; and
    a drive mechanism coupling said electric motor to said drive lever to move said drive lever in accordance with said reverse or forward rotation of said electric motor such that said vanes are rotated to said light-blocking position or said light-admitting position.

3. A light screen device according to claim 2 further including a change-over switch for controlling said electric motor to rotate in one of said forward and reverse directions in response to said vanes being in said light-blocking position and in the other of said forward and reverse directions in response to said vanes being in said light-admitting position.

4. A light screen device according to claim 3 wherein said vanes comprise elongate members having a central axis parallel to the longest dimension of the window.

5. A light screen device for selectively blocking light from entering through a window of an automobile comprising:
    a plurality of screen vanes adjacent the window; and
    means for rotating said vanes between a light blocking position and a light admitting position said rotating means comprising driving means operated selectively to cause rotation of said vanes between said light blocking and light admitting in response to a first signal from a position detecting means, said signal indicating a light blocking and light admitting position of said vanes, and in response to a second signal indicating presence or absence of an operator in an operator's seat of the automobile, said driving means rotating said vanes to light admitting position when said first signal indicates said vanes are in the light blocking position and when said second signal indicates the presence of an operator in the operator's seat and said driving means rotating said vanes to the light blocking position when said first signal indicates said vanes are in the light admitting position and when said second signal indicates the absence of an operator in the operator's seat.

6. A light screen sensor device according to claim 5 wherein said rotating and driving means further comprises:
    a plurality of pivot pins on which said vanes are singly mounted for rotation;
    a drive lever connected to each of said vanes for rotating said vanes about said pivot pins;
    an electric motor rotatable in a forward and a reverse direction; and
    a drive mechanism coupling said electric motor to said drive lever to move said drive lever in accordance with said reverse or forward rotation of said electric motor such that said vanes are rotated to said light-blocking position or said light-admitting position.

7. A light screen device according to claim 6 further including a change-over switch for controlling said electric motor to rotate in one of said forward and reverse directions in response to said vanes being in said light-blocking position and in the other of said forward and reverse directions in response to said vanes being in said light-admitting position.

8. A light screen device according to claim 7 wherein said vanes comprise elongate members having a central axis parallel to the longest dimension of the window.

* * * * *